United States Patent
Kurita

(10) Patent No.: US 7,781,079 B2
(45) Date of Patent: Aug. 24, 2010

(54) PERPENDICULAR MAGNETIC RECORDING MEDIUM, ITS MANUFACTURING METHOD, AND A MAGNETIC STORAGE APPARATUS

(75) Inventor: Ryo Kurita, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 258 days.

(21) Appl. No.: 11/973,520

(22) Filed: Oct. 9, 2007

(65) Prior Publication Data

US 2008/0085426 A1    Apr. 10, 2008

(30) Foreign Application Priority Data

Oct. 10, 2006   (JP) ............................. 2006-276762

(51) Int. Cl.
G11B 5/66 (2006.01)
(52) U.S. Cl. ..................................... 428/827
(58) Field of Classification Search ........................ None
See application file for complete search history.

(56) References Cited

U.S. PATENT DOCUMENTS

2005/0214585 A1* 9/2005 Li et al. ...................... 428/828
2006/0228586 A1* 10/2006 Girt et al. ................... 428/828

FOREIGN PATENT DOCUMENTS

JP  2005-302150   10/2005

* cited by examiner

Primary Examiner—Holly Rickman
(74) Attorney, Agent, or Firm—Greer, Burns & Crain, Ltd.

(57) ABSTRACT

A perpendicular magnetic recording medium includes a substrate, a soft magnetic lining layer formed on the substrate, and a recording layer. The recording layer includes a first recording layer, an auxiliary recording layer, and a second recording layer that are laminated in this sequence. The first and the second recording layers are ferromagnetic layers that have a magnetization easy axis perpendicular to the layers. The auxiliary recording layer includes two or more magnetic particles mutually separated by non-magnetism members, wherein the magnetic particles are arranged approximately perpendicular to the layer and have the magnetization easy axis in a direction slanted with reference to the layer. The auxiliary recording layer is exchange-coupled with the adjoining first recording layer and second recording layer. The perpendicular magnetic recording medium may include an exchange-coupling-strength control layer between the first recording layer and the auxiliary recording layer, or alternatively, between the auxiliary recording layer and the second recording layer.

16 Claims, 9 Drawing Sheets

PERPENDICULAR MAGNETIC RECORDING MEDIUM, ITS MANUFACTURING METHOD, AND A MAGNETIC STORAGE APPARATUS

BACKGROUND OF THE INVENTION

1. Field of the Invention

The present invention relates to a perpendicular magnetic recording medium that includes two or more recording layers, its manufacturing method, and a magnetic storage apparatus that includes the perpendicular magnetic recording medium.

2. Description of the Related Art

In recent years and continuing, magnetic storage apparatuses that include a perpendicular magnetic recording medium attract attention for the medium's high-density recording capability compared with a conventional in-plane magnetic recording medium (longitudinal magnetic recording medium). The perpendicular magnetic recording medium records information by perpendicularly magnetizing a recording bit (magnetic domain) that is formed on a surface of a recording layer, wherein adjacent recording bits are arranged non-parallel to each other.

As for the perpendicular magnetic recording medium, the so-called "heat fluctuation" associated with high-density recording is a problem. With the heat fluctuation, recorded information is lost because the number of magnetic domains is decreased. In order to realize a recording medium that can stand the heat fluctuation, a ferromagnetic material having great magnetic anisotropic energy Ku is necessary, or alternatively a great volume of the magnetic domain is required. Further, if the magnetic anisotropic energy Ku is great, the intensity of a recording magnetic field has to be great.

Further, if the volume of the magnetic domain is great for high-density recording, the thickness of the magnetic film has to be great. If the thickness of the magnetic film is great, the intensity of the recording field has to be great, posing a problem in that transitional noise is increased due to flattening of the slope of the recording field intensity in an in-plane direction. As described above, measures against the heat fluctuation are desired wherein satisfactory saturation recording characteristics are obtained.

An attempt to solve the problem is made by structuring the recording layer with a multilayer of two or more layers. The attempt aims at improving the recording characteristics by laminating the recording layers having different magnetic anisotropy. However, the intensity of the recording field generated by a head has to be great even if the number of the layers is two.

In view of the above, a magnetic recording medium called an Exchange Coupled Composite (ECC) medium is proposed. The ECC is a perpendicular magnetic recording medium. The recording layer of the ECC includes two or more magnetic layers having different directions of magnetization easy domain. According to the ECC, it is expected that thermal stability will be obtained while the intensity of the recording field is reduced and side erasing is reduced (for example, Patent Reference 1).

Patent Reference 1 discloses a perpendicular magnetic recording medium including a first recording layer and a second recording layer, wherein the first recording layer includes magnetic particles perpendicularly arranged to a film surface, and the second recording layer includes magnetic particles that are inclined in a direction of a track width. Here, the second recording layer is formed by depositing sputter particles that come in a predetermined angle range, while other sputter particles are intercepted by a shield plate. Therefore, the sputter particles are wastefully consumed, and depositing speed is slow.

[Patent reference 1] JPA 2005-302150

SUMMARY OF THE INVENTION

The perpendicular magnetic recording medium includes a substrate and a recording layer. The recording layer includes a soft magnetic lining layer formed on the substrate, a first recording layer, an auxiliary recording layer, and a second recording layer that are deposited in this sequence on the soft magnetic lining layer. The first and the second recording layers are ferromagnetic layers having a magnetization easy axis perpendicular to the film surface. The auxiliary recording layer includes two or more magnetic particles arranged perpendicular to the film surface, and separated by non-magnetism members wherein the magnetization easy axis of the magnetic particles is slanted with reference to the film surface. Here, adjacent ones of the first recording layer, the auxiliary recording layer, and the second recording layer are exchange-coupled.

A magnetic storage apparatus includes the perpendicular magnetic recording medium as described above, and a recording/reproducing unit including a recording element and a magneto-resistance-effect type reproduction element. The magnetic storage apparatus is capable of storing information at a high recording density.

Another aspect of the embodiment of the present invention provides a manufacturing method of the perpendicular magnetic recording medium, wherein the manufacturing method includes a step of forming the soft magnetic lining layer on the substrate, a step of forming the first recording layer that has the magnetization easy axis perpendicular to the film surface on the soft magnetic lining layer, a step of forming the auxiliary recording layer on the first recording layer, and a step of forming the second recording layer that has the magnetization easy axis perpendicular to the film surface on the auxiliary recording layer. The step of forming the auxiliary recording layer forms the layer by sputtering a target that includes a ferromagnetic material, the main component of which material is CoCr wherein the content of Cr ranges between 5 at % and 25 at %.

Another aspect of the embodiment of the present invention provides a manufacturing method of the perpendicular magnetic recording medium, wherein the manufacturing method includes a step of forming the soft magnetic lining layer on the substrate, a step of forming the first recording layer that has the magnetization easy axis perpendicular to the film surface on the soft magnetic lining layer, a step of forming the auxiliary recording layer on the first recording layer, and a step of forming the second recording layer that has the magnetization easy axis perpendicular to the film surface on the auxiliary recording layer. The step of forming the auxiliary recording layer forms the layer by simultaneously sputtering a ferromagnetic material, the main component of which material is CoCr, wherein the content of Cr ranges between 5 at % and 25 at %, and a non-magnetism compound that is non-solid-soluble.

DESCRIPTION OF THE PREFERRED EMBODIMENTS

In the following, embodiments of the present invention are described with reference to the accompanying drawings.

Figure 1:
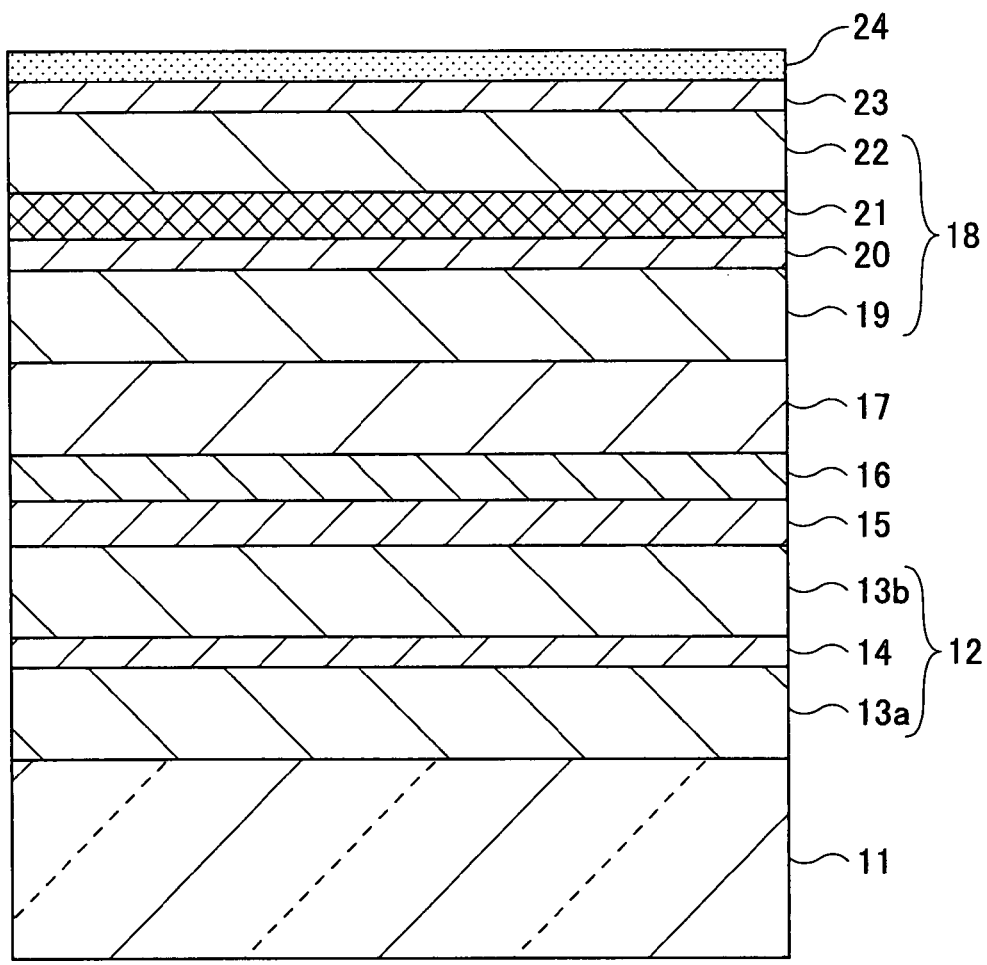
FIG. 1 is a cross-sectional drawing of a perpendicular magnetic recording medium according to the first implementation of the first embodiment of the present invention.

FIG. 1 is a cross-sectional drawing of a perpendicular magnetic recording medium 10 according to the first implementation of the first embodiment of the present invention.

With reference to FIG. 1, the perpendicular magnetic recording medium 10 according to the first implementation of the first embodiment includes a substrate 11, a soft magnetic lining layer 12, a seed layer 15, a foundation layer 16, a middle layer 17, a recording layer 18, a protection film 23, and a lubricous (lubricating) layer 24 deposited one by one on the substrate 11. The recording layer 18 further includes a first recording layer 19, an exchange-coupling-strength control layer 20, an auxiliary recording layer 21, and a second recording layer 22 in this sequence from the side of the substrate 11. According to the perpendicular magnetic recording medium 10, the auxiliary recording layer reduces the intensity of a recording magnetic field required at the time of recording so that an over-writing characteristic and an S/N ratio may be improved.

The substrate 11 is made of no special material, but common materials such as a glass, a Ni plated aluminum alloy, silicone, plastics, ceramics, and carbon may be used.

The soft magnetic lining layer 12 includes two soft magnetic layers 13a and 13b, and a non-magnetism coupling layer 14 inserted between the soft magnetic layers 13a and 13b. The magnetic layers 13a and 13b are exchange-coupled in anti-ferromagnetism. The soft magnetic layers 13a and 13b are 20 nm to 2 µm thick, and are made from one of an amorphous and a crystallite material that contains at least one of Fe, Co, Ni, Al, Si, Ta, Ti, Zr, Hf, V, Nb, C, and B. The soft magnetic layers 13a and 13b contain a material such as CoNbZr, CoTaZr, FeCoB, FeTaC, FeAlSi, and NiFe.

The non-magnetism coupling layer 14 is 0.5 to 1.2 nm thick, and is made from a material such as Ru, Rh, Ir, Ru system alloy, Rh system alloy, and Ir system alloy. Here, the Ru system alloy, the Rh system alloy, and the Ir system alloy include one of Co, Cr, Fe, nickel, Mn, and an alloy of these elements.

Since the soft magnetic layers 13a and 13b of the soft magnetic lining layer 12 are magnetized by exchange coupling in antiferromagnetism, formation and movement of a magnetic wall in the soft magnetic layers 13a and 13b is reduced and a noise spike is reduced. In addition, when the perpendicular magnetic recording medium 10 is a magnetic disk, the magnetization easy axis of the soft magnetic layers 13a and 13b is desired to be oriented in the direction of the diameter of the magnetic disk.

In addition, although the soft magnetic lining layer 12 is desired to have the structure as described above, if the noise spike can be sufficiently reduced, the soft magnetic layer 12 may have only one of the soft magnetic layers 13a and 13b.

The seed layer 15 is 2.0 nm to 10 nm thick, and includes a non-magnetism layer of an amorphous material that contains one of Ta, W, Mo, and the like. The seed layer 15 is for improving crystal orientation of crystal particles of the foundation layer 16 formed on the seed layer 15, and for equalizing particle diameters of the crystal particles of the foundation layer 16. In addition, although it is desirable that the seed layer 15 be provided as described above, the seed layer 15 may be omitted.

The foundation layer 16 is a crystalline-substance layer having a face-centered cubic lattice (fcc) crystal structure. The crystalline-substance layer may be made from a material such as Cu, Ni, NiFe, NiCr, and NiCu. The crystalline-substance layer preferentially grows in the (111) crystal plane. The middle layer 17 (arranged on the foundation layer 16) is made from a material that has a hexagonal close-packed (hcp) crystal structure; for this reason, the crystal plane (0002) preferentially grows on the crystal plane (111) of the crystalline-substance layer 16 that has the fcc crystal structure. In addition, although it is desirable that the foundation layer 16 be provided as described above, the foundation layer 16 may be omitted.

The middle layer 17 is made from one of Ru and Ru alloy, wherein the Ru alloy includes Ru-X1 alloy that has a hcp crystal structure. Here, X1 is at least one of Co, Cr, Fe, Ni, and Mn. Although the crystal plane (0002) of the middle layer 17 grows without the seed layer 15 and foundation layer 16, crystallinity and crystal orientation are improved if the middle layer 17 is formed on one of the foundation layer 16 and the seed layer 15 rather than being directly formed on the soft magnetic layer 12. Especially, if the middle layer 17 is formed on the foundation layer 16, preferential epitaxial growth of the crystal plane (0002) is promoted, and crystallinity and crystal orientation are further improved. Consequently, the middle layer 17 improves magnetic properties such as the crystal orientation and coercive force of the recording layer 18. Consequently, the S/N ratio of the perpendicular magnetic recording medium 10 is improved.

Here, it is desirable that crystal particles of Ru, and the like, of the middle layer 17 grow perpendicular to the film surface, are arranged in the in-plane direction, and are mutually dissociated (separated). In this way, the magnetic particles constituting the first recording layer 19 are mutually dissociated, medium noise is reduced, and the S/N ratio is improved. Further, the configuration as described above carries over to the auxiliary recording layer 21, and the magnetic particles constituting the auxiliary recording layer 21 are mutually dissociated. In this way, magnetization reversal of the magnetic particles is facilitated, and the required intensity of the recording magnetic field for magnetization reversal is reduced. Therefore, the recording property of the perpendicular magnetic recording medium 10 is improved.

The protection film 23 is formed on the recording layer 18. The protection film 23 is made from no special material, but may be made from a material such as amorphous carbon, carbon hydride, carbon nitride, and aluminum oxide, having a thickness of 0.5 nm to 15 nm.

The lubricous layer 24 is made of no special material, but can be made from a lubricant having a main chain of perfluoropolyether for a thickness 0.5 nm to 5 nm, for example. The lubricous layer 24 may be dispensed with depending on the material of the protection film 23.

Next, descriptions of the recording layer 18 follow.

Figure 2:
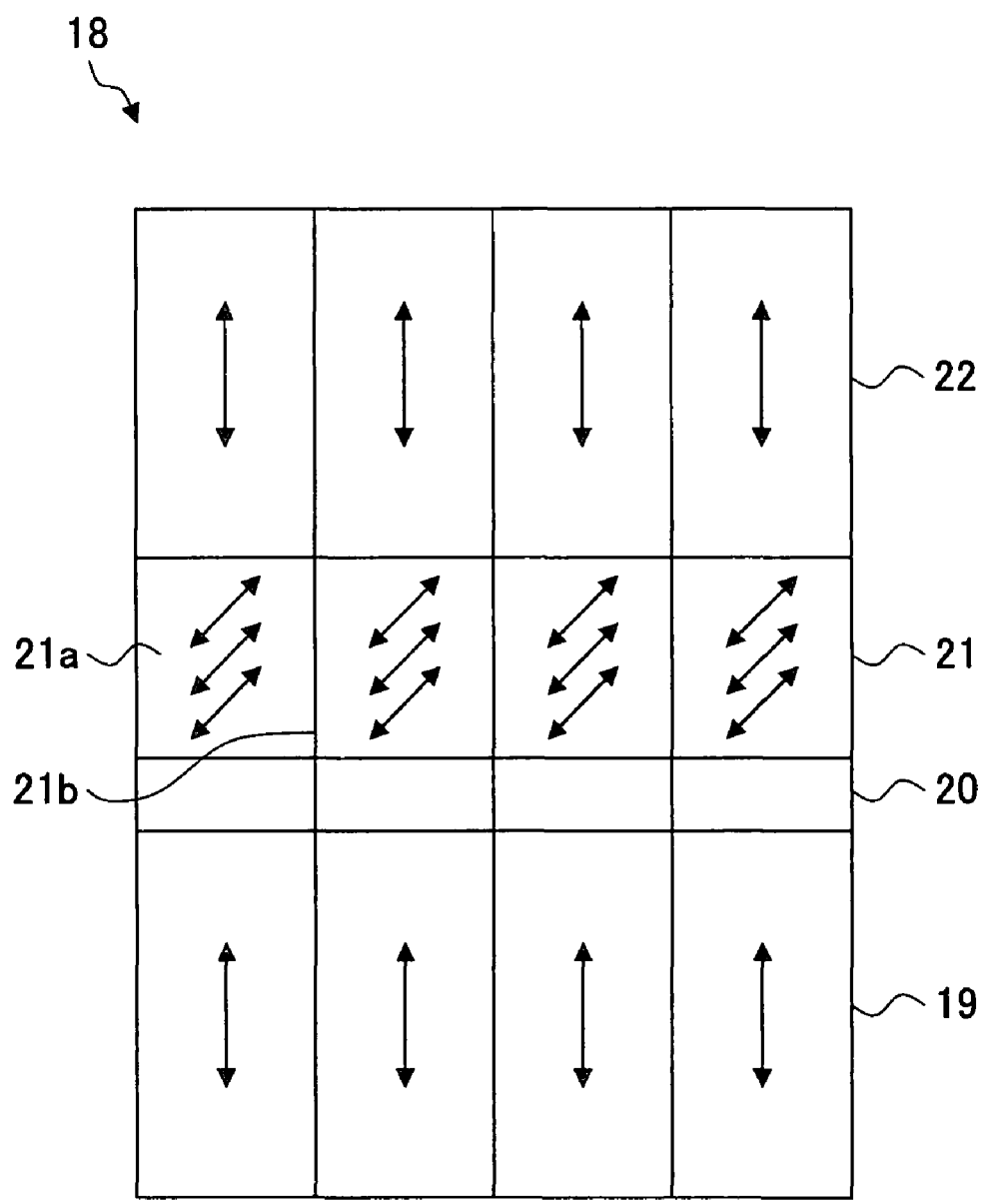
FIG. 2 is a schematic drawing for explaining a magnetization easy axis orientation of a recording layer shown in FIG. 1.

First, the magnetization easy axis of the recording layer 18 (FIG. 1) is described with reference to FIG. 2.

The recording layer 18 includes the first recording layer 19, the exchange-coupling-strength control layer 20, the auxiliary recording layer 21, and the second recording layer 22 that are laminated in this sequence on the substrate 11. The first recording layer 19 and the second recording layer 22 are mainly for obtaining heat-fluctuation resistance. The auxiliary recording layer 21 is for obtaining the heat-fluctuation resistance and for facilitating magnetization reversal of the recording layer 18 when recording. Further, the exchange-coupling-strength control layer 20 is for controlling the exchange-coupling strength between the first recording layer 19 and the auxiliary recording layer 21.

The first recording layer 19 and the second recording layer 22 are made from a ferromagnetic material that includes a ferromagnetic material having the hcp crystal structure. The ferromagnetic material having the hcp crystal structure includes CoCr, CoPt, CoCrTa, CoCrPt, and CoCrPt-M (where M is at least one of B, Mo, Nb, Ta, W, and Cu). Hereafter, the ferromagnetic material is called a recording layer ferromagnetism material. The first recording layer 19 and the second recording layer 22 may be a so-called continuation film, i.e., a ferromagnetic layer including only the recording layer ferromagnetism material.

Alternatively, the first recording layer 19 and the second recording layer 22 are made from a ferromagnetic material that is formed in an atmosphere containing oxygen gas when forming the recording layer ferromagnetism material by sputtering such that the oxygen is taken into the film. Since oxygen is taken into grain boundaries that are boundaries of the magnetic particles, the thickness of the grain-boundaries is increased, and the separation of the magnetic particles is improved. In this way, the medium noise is reduced and the S/N ratio is improved. By the recording layer ferromagnetism material containing O (oxygen), the composition of the recording layer 18 is such as CoCr—O, CoCrPt—O, CoCrPt—O, and CoCrPt-M-O.

Further alternatively, the first recording layer 19 and the second recording layer 22 may be so-called granular films that include a non-solid-soluble layer that includes magnetic particles of the recording layer ferromagnetism material, which magnetic particles are surrounded by a nonmagnetic material. The magnetic particles are shaped like pillars and grow from the surface of the middle layer 17 in a direction approximately perpendicular to the substrate 11. The magnetic particles are mutually separated by the non-solid-soluble layer in the in-plane direction. The non-solid-soluble layer includes a non-magnetic material that does not dissolve in the ferromagnetic material that forms the magnetic particles, or that does not form a compound. The non-solid-soluble layer is made of a compound that includes one of Si, Al, Ta, Zr, Y, Ti, and Mg, and one of O, N, and C; for example, an oxide such as $SiO_2$, $Al_2O_3$, $Ta_2O_5$, $ZrO_2$, $Y_2O_3$, $TiO_2$, and MgO, a nitride such as $Si_3N_4$, AlN, TaN, ZrN and TiN, and $Mg_3N_2$, and a carbide such as SiC, TaC, ZrC, and TiC. Since the magnetic particles are physically separated from adjacent magnetic particles by the non-solid-soluble layer that includes the nonmagnetic material, magnetic interaction is reduced; consequently the medium noise is reduced, and the S/N ratio is improved.

Here, it is desirable that the granular film be made of magnetic particles that include one of CoCrPt and CoCrPt-M and the non-solid-soluble layer include an oxide. Further, it is more desirable that the non-solid-soluble layer include one of $SiO_2$ and $TiO_2$. By the desired composition, the magnetic particles are separated approximately uniformly by the non-solid-soluble layer, and a desirable magnetic property and desirable recording/reproducing characteristics are obtained.

Further alternatively, the first recording layer 19 and the second recording layer 22 may be ferromagnetic artificial lattice films that include a lamination of a thin film of a ferromagnetic element and a thin film of a non-magnetism element by turns. The ferromagnetic artificial lattice film may be one of a lamination of Co layers and Pd layers by turns (Co/Pd artificial lattice film), and a lamination of Co layers and Pt layers by turns (Co/Pt artificial lattice film). The magnetization easy axis of the ferromagnetic artificial lattice film is perpendicular to the surface of the film. A uniaxial anisotropy constant of the ferromagnetic artificial lattice film generally is greater than that of the recording layer ferromagnetism material; therefore, the ferromagnetic artificial lattice film can easily increase coercive force. In addition, the number of the Co layers, Pd layers, or Pt layers, as applicable that are laminated may be one or two.

The exchange-coupling-strength control layer 20 is made from one of Ru, Rh, Ir, Ru system alloy, Rh system alloy, Ir system alloy, Cu, and Cr. As for the Ru system alloy, the Rh system alloy, and the Ir system alloy, one of Co, Cr, Fe, Ni, Mn, and alloys of these elements is used as the additional element. The Ru and the Ru system alloy generally have a lattice constant that is almost equivalent to that of the CoCrPt system alloy, and therefore provide satisfactory lattice consistency.

Further, it is desirable that the film thickness of the exchange-coupling-strength control layer 20 be 0.1 nm to 0.5 nm. In this way, the first recording layer 19 and the auxiliary recording layer 21 can carry out exchange coupling in ferromagnetism, and the exchange-coupling strength can be controlled. Here, if the exchange-coupling strength does not have to be controlled, the exchange-coupling-strength control layer 20 can be dispensed with.

The auxiliary recording layer 21 includes two or more magnetic particles 21a that are arranged approximately perpendicular to the film surface and that are mutually separated into groups by non-magnetism members 21b. The magnetic particles 21a are made from a ferromagnetic material, and have the magnetization easy axes in a direction that is uniformly slanted toward the film surface. Further, the non-magnetism members 21b are made from a nonmagnetic material, and are formed separating the groups of the magnetic particles 21a. If the auxiliary recording layer 21 is made from a ferromagnetic material that mainly contains CoCr, the non-magnetism members 21b are formed by Cr that is segregated to boundaries between the magnetic particles 21a. The non-magnetism members 21b may have a gap section as described below. By the gap section, separation of the groups of the magnetic particles 21a is promoted. Further, the gap section of the non-magnetism members 21b can be formed by adjusting gas pressure when forming the auxiliary recording layer 21 in a predetermined range (pressure greater than the usual film formation pressure) as described below.

It is desired that the auxiliary recording layer 21 include a ferromagnetic material, the main material of which is CoCr, wherein if the whole CoCr is made into 100 at %, Cr content ranges between 5 at % and 25 at %. Thereby, the magnetization easy axis of the auxiliary recording layer 21 is formed in the direction that is slanted toward the film surface. Further, it is desirable that the Cr content range be between 15 at % and 20 at %. In this case, the magnetization easy axis of the auxiliary recording layer 21 desirably ranges between 70° (degrees) and 90° (degrees).

The ferromagnetic material, the main material of which is CoCr, is one of CoCr and CoCr-X2, where X2 is an additional material and is at least one of Mo, Mn, V, and W. The content of the additional element X2 is less than 10 at % to the whole material. By adding the additional element X2 in this way, the auxiliary recording layer 21 epitaxially grows with satisfactory lattice consistency on the first recording layer 19 or the exchange-coupling-strength control layer 20, as applicable, and further enables the second recording layer 22 to epitaxially grow with satisfactory lattice consistency on the auxiliary recording layer 21. Further, saturation magnetization of the auxiliary recording layer 21 can be reduced by adding the addition material X2.

Further, the auxiliary recording layer 21 may be the granular film described above. In this case, the non-solid-soluble layer of the granular film serves as the non-magnetism members 21b, and the separation of the magnetic particles 21a is improved. As described above, the desired material for the magnetic particles 21a is a ferromagnetic material wherein CoCr is the main material so that the magnetization easy axis is made in the direction slanted toward the film surface.

Further, the magnetization easy axis of the first recording layer 19 and the second recording layer 22 is perpendicular to the film surface. On the other hand, the magnetization easy axis of the auxiliary recording layer 21 is made 45° (degrees) or greater, and less than 90° (degrees) to the film surface. Accordingly, the magnetization reversal of the auxiliary recording layer 21 can take place by a smaller intensity of the recording field compared with the case where the magnetization easy axis is 90° (degrees). In this way, magnetization reversal of the first recording layer 19 and the second recording layer 22 is facilitated by the magnetization reversal of the auxiliary recording layer 21. It is desired that the magnetization easy axis of the auxiliary recording layer 21 be within a range between 60° (degrees) and 80° (degrees) toward the film surface. This range is easily obtained by the ferromagnetic material, the main component of which is CoCr. The magnetization easy axis of 80° (degrees) or less realizes the magnetization reversal at an intensity of the recording field less than the case of 90° (degrees) As for the combination of the first recording layer 19 and the second recording layer 22, it is desirable that the first recording layer 19 be a granular film, and the second recording layer 22 be one of a continuation film and an artificial lattice film. In this way, compared with the case where the granular film is a monolayer, a saturation field Hs, ΔHs (see below), and the coercive force of the whole recording layer 18 can be decreased. Further, a magnetic field of crystal nucleation takes a negative value, and its absolute value can be increased; for this reason, the reproducing characteristics can be improved. Here, ΔHs is the difference between the saturation field Hs and a minimum value of the field at which magnetization is saturated in a hysteresis loop (magnetization-field curve).

For high-density recording, it is desirable that the thickness of the first recording layer 19 be between 8 nm and 12 nm, the thickness of the second recording layer 22 be between 5 nm and 10 nm, and the thickness of the auxiliary recording layer 21 be between 0.5 nm and 2 nm.

According to the first implementation of the perpendicular magnetic recording medium 10 of the first embodiment as described above, the auxiliary recording layer 21 is provided, wherein the magnetization easy axis of the magnetic particles 21a is slanted toward the film surface, so that the magnetization reversal of the first recording layer 19, the auxiliary recording layer 21, and the second recording layer 22 (which are exchanged coupled) can take place at a reduced intensity of the recording field. Furthermore, since the magnetic particles 21a of the auxiliary recording layer 21 are separated by the non-magnetism members 21b, the distribution width of the recording magnetic field intensity for carrying out the magnetization reversal is reduced. In this way, the recording characteristics, for example, the over-writing characteristic, of the perpendicular magnetic recording medium 10 are improved. Consequently, the S/N ratio is improved and high-density recording is attained.

Next, a manufacturing method of the perpendicular magnetic recording medium 10 according to the first implementation of the first embodiment is described with reference to FIG. 1 and FIG. 2.

First, the substrate 11 is laid in a vacuum container. Here, the substrate 11 may be heated in a vacuum in order to dry the surface of the substrate 11; in this case, the substrate 11 is cooled before forming the soft magnetic lining layer 12 and further processes are performed.

Then, the soft magnetic lining layer 12 is formed on the substrate 11. Specifically, the soft magnetic layer 13a, the non-magnetism coupling layer 14, and the soft magnetic layer 13b are formed in this sequence by sputtering. It is desirable to use a UHV sputtering system capable of providing a vacuum up to $10^{-7}$ Pa. In addition, the soft magnetic layers 13a and 13b may be formed by using an electroless-plating method, electroplating, a vacuum evaporation method, etc., which is especially effective if the soft magnetic lining layer 12 is a soft magnetic monolayer.

Subsequently, the seed layer 15 is formed on the soft magnetic lining layer 12 by sputtering using the sputtering target that contains the material described above. For example, the seed layer 15 is formed by a DC magnetron method in an inert-gas atmosphere, for example, an Ar gas atmosphere, the pressure of which is 0.4 Pa, with injection electric power of 0.5 kW. In this case, it is desirable that the substrate 11 not be heated. In this way, crystallization and growth of a crystallite of the soft magnetic lining layer 12 (the soft magnetic layers 13a and 13b) can be reduced. Nevertheless, the substrate 11 may be heated at a temperature of 150° C. (degrees Celsius) or less, at which temperature crystallization and growth of the crystallite of the soft magnetic lining layer 12 are not remarkable. In addition, the temperature conditions for the substrate 11 in the case of forming the seed layer 15 are applicable to processes of forming the foundation layer 16, the middle layer 17, and the recording layer 18 (the first recording layer 19, the exchange-coupling-strength control layer 20, the auxiliary recording layer 21, and the second recording layer 22).

Subsequently, the foundation layer 16, the middle layer 17, and the recording layer 18 are formed one by one on the seed layer 15 using the sputtering target of the material described above under the same formation conditions as those for forming the seed layer 15.

Here, at the step of forming the first recording layer 19 and the second recording layer 22, the inert-gas atmosphere may be replaced by a mixed atmosphere such as a mixture of inert gas and oxygen gas, and a mixture of inert gas and nitrogen gas; or alternatively, one of oxygen gas and nitrogen gas. In this case, the separation of the magnetic particles of the first recording layer 19 and the second recording layer 22 is improved, the medium noise is reduced, and the S/N ratio is improved.

If one of the first recording layer 19 and the second recording layer 22 is a granular film, it is formed by simultaneously sputtering the sputtering target of the ferromagnetic material described above and the nonmagnetic material of the non-solid-soluble layer in the inert-gas atmosphere. Here, if the nonmagnetic material is one of oxide, nitride, and carbide, as the atmosphere gas, oxygen gas, nitrogen gas, and carbon dioxide gas, respectively, may be used; alternatively, an inert gas may be added to the respective gases. In this way, decreases in the contents of the oxygen, nitrogen, and carbon of the non-solid-soluble layer with reference to stoichiometric composition are minimized; accordingly, a high-quality recording layer can be formed. Consequently, durability and corrosion resistance of the perpendicular magnetic recording medium 10 are attained. Here, the sputtering target may be one sputtering target that is a compound including the ferromagnetic material and the nonmagnetic material instead of the two separate sputtering targets described above. In this way, the molar ratio of the magnetic particles of the film to the non-solid-soluble layer of the first recording layer 19 and the second recording layer 22 is easily controlled.

The auxiliary recording layer 21 is formed by sputtering in an inert-gas atmosphere such as Ar gas using a sputtering target that includes a ferromagnetic material, the main component of which material is CoCr, as described above, wherein the Cr content ranges between 5 at % and 25 at %. In this way, the magnetization easy axis of the magnetic particles 21a of the auxiliary recording layer 21 is slanted with reference to the film surface. Further, it is desirable that the Cr content range between 15 at % and 20 at %, in which case the magnetization easy axis of the magnetic particles 21a of the auxiliary recording layer 21 ranges between 70° (degrees) and 90° (degrees).

Further, in order to improve the separation between the groups of the magnetic particles 21a, the gas pressure for forming the auxiliary recording layer 21 ranges between 1.5 Pa and 10 Pa; more preferably between 2.0 Pa and 10 Pa. With the gas pressure 2.0 Pa or greater, a gap section is formed in the non-magnetism members 21b between the magnetic particles 21a, so that the separation between the magnetic particles 21a is improved and the S/N ratio is notably improved. However, if the gas pressure exceeds 10 Pa, a film property, especially the crystallinity, of the magnetic particles 21a of the auxiliary recording layer 21 is degraded. Further, one of oxygen gas, nitrogen gas, and carbon dioxide gas may be added to the inert gas as the atmosphere gas such that the separation of the magnetic particles 21a is further improved.

If the auxiliary recording layer 21 is a granular film, it is formed by the same material and according to the same conditions as described above for forming the first recording layer 19 and the second recording layer 22. Here, the gas pressure for forming the film ranges between 1.5 Pa and 10 Pa; and more preferably between 2.0 Pa and 10 Pa.

Subsequently, the protection film 23 is formed on the recording layer 18. Methods for forming the protection film 23 include sputtering, CVD, and FCA (Filtered Cathodic Arc). Further, the lubricous layer 24 is applied to the surface of the protection film 23 by a method such as an immersing method (pulling method), a spin coat method, and a liquid-level lowering method. With the above, the perpendicular magnetic recording medium 10 according to the first implementation of the first embodiment of the present invention is formed.

In addition, it is desirable that the processes of forming the seed layer 15 through the protection film 23 described above be carried out in a vacuum or the applicable atmosphere described above, and the formed layers not be exposed to the open air in respect to detergent action on the substrate 11 and the surface of the layers that have been already formed.

As described above, according to the manufacturing method of the first embodiment, the perpendicular magnetic recording medium 10 of the first implementation is formed. According to the method, the auxiliary recording layer 21 is made from a ferromagnetic material, the main component of which material is CoCr, wherein Cr content ranges between 5 at % and 25 at % so that the magnetization easy axis of the magnetic particles 21a of the auxiliary recording layer 21 can be slanted with reference to the film surface. Especially, if the gas pressure for forming the auxiliary recording layer 21 is between 2.0 Pa and 10 Pa, the separation of the magnetic particles of the auxiliary recording layer 21 is improved and orderly magnetization reversal of the auxiliary recording layer 21 is obtained. For this reason, the intensity distribution of the recording magnetic field with which the auxiliary recording layer 21 carries out magnetization reversal is made small. Accordingly, the recording characteristic, for example, the over-writing characteristic is improved. Consequently, the S/N ratio of the perpendicular magnetic recording medium 10 is improved, and high-density recording is attained.

Figure 3:
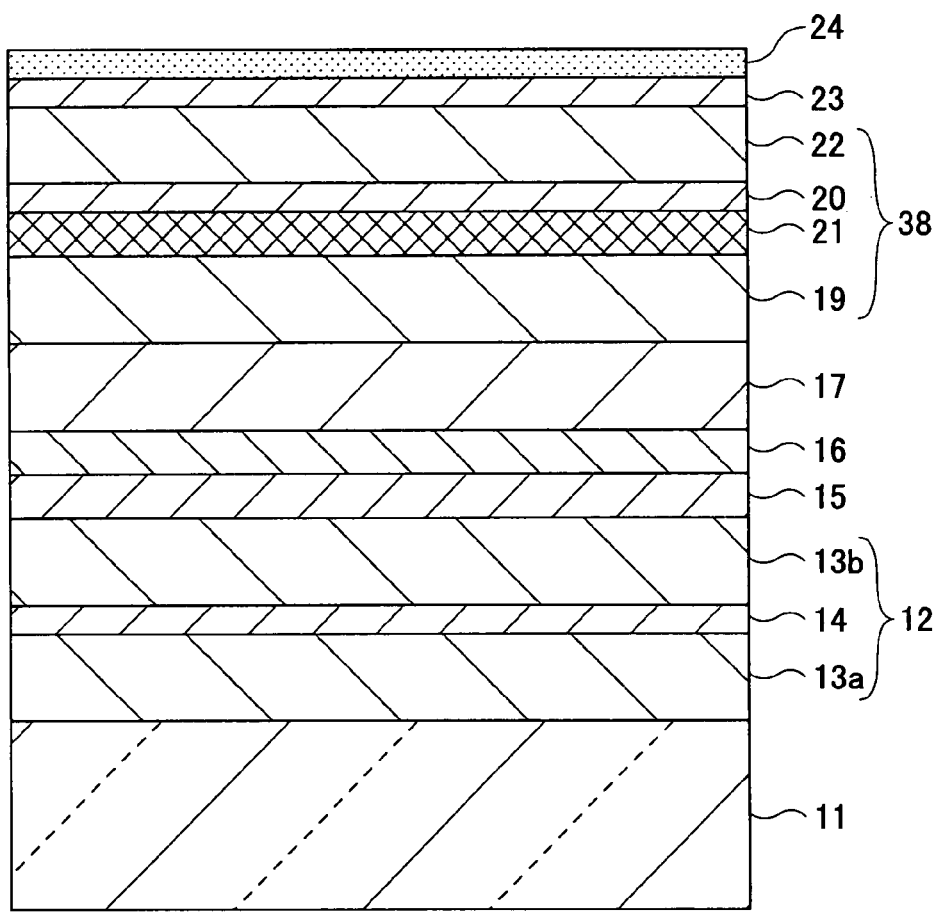
FIG. 3 is a cross-sectional drawing of the perpendicular magnetic recording medium according to the second implementation of the first embodiment.

FIG. 3 is a cross-sectional drawing of a perpendicular magnetic recording medium 30 according to the second implementation of the first embodiment. The same reference numbers are given to the parts corresponding to the parts described above, and descriptions thereof are not repeated.

The perpendicular magnetic recording medium 30 according to the second implementation includes a recording layer 38 that further includes the first recording layer 19, the auxiliary recording layer 21, the exchange-coupling-strength control layer 20, and the second recording layer 22 laminated in this sequence on the substrate 11 as shown in FIG. 3. The perpendicular magnetic recording medium 30 has the same configuration as the perpendicular magnetic recording medium 10 of the first implementation except that the sequence of laminating the auxiliary recording layer 21 and the exchange-coupling-strength control layer 20 is different. The perpendicular magnetic recording medium 30 of the second implementation provides the same effect as the perpendicular magnetic recording medium 30 of the first implementation.

Next, descriptions follow about specific examples of the perpendicular magnetic recording medium according to the first embodiment and a comparative example of the perpendicular magnetic recording medium that were produced.

SPECIFIC EXAMPLE

The specific examples of the perpendicular magnetic recording medium according to the first embodiment were prepared. The specific examples include the following components laminated on the substrate in this sequence. Unless otherwise specified, values in the parenthesis show thickness of the associated components.

Substrate: glass substrate (65 mm φ)
Soft magnetic lining layer: CoNbZr film (25 nm)/Ru film (0.7 nm)/CoNbZr film (25 nm)
Seed layer: Ta film (3 nm)
Foundation layer: NiFeCr film (3 nm)
Middle layer: Ru film (20 nm)
Recording layer:
First recording layer: CoCrPt—SiO$_2$ film (10 nm)
Exchange-coupling-strength control layer: Ru film (0.2 nm)
Auxiliary recording layer: Co$_{80}$Cr$_{20}$ film (0.5 nm)
Second recording layer: CoCrPt film (6 nm)
Protection film: Carbon film (4 nm)
Lubricous layer: Perfuluoro polyether (1 nm)

The specific examples of the perpendicular magnetic recording medium were manufactured as follows.

First, the glass substrate in the shape of a disk was washed and dried. Then, the CoNbZr film for the soft magnetic lining layer through the carbon film for the protection film were formed using corresponding sputtering targets by a DC magnetron sputtering system at a vacuum of $1.0 \times 10^{-5}$ Pa, wherein Ar gas was supplied at a pressure of 0.67 Pa. Nevertheless, as for the auxiliary recording layer, the specific examples were made at different pressures 0.5 Pa, 2.0 Pa, and 4.0 Pa for forming the Co$_{80}$Cr$_{20}$ film. Furthermore, the lubricous layer was formed by the immersing method (Czochralski method) on the protection film.

COMPARATIVE EXAMPLE

The comparative example of the perpendicular magnetic recording medium is not according to the embodiment of the present invention. Specifically, the comparative example does not include the exchange-coupling-strength control layer (Ru film) nor the auxiliary recording layer (Co$_{80}$Cr$_{20}$ film), but includes the first recording layer (CoCrPt—SiO$_2$ film) and the second recording layer (CoCrPt film). Otherwise, the comparative example is the same as the specific examples.

Figure 4:
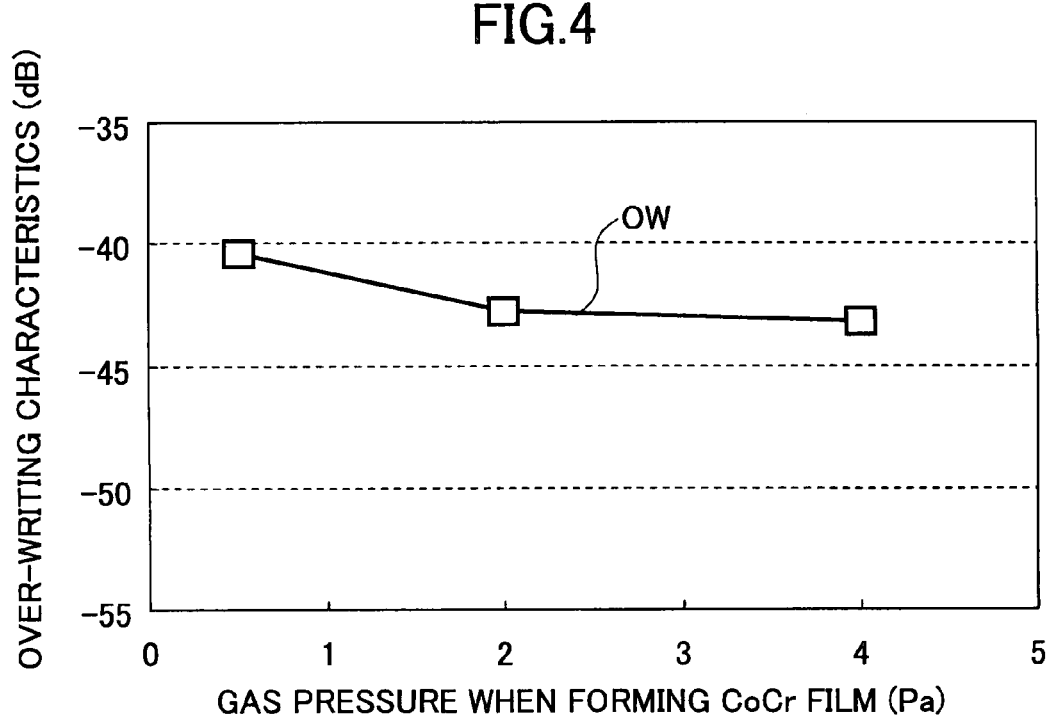
FIG. 4 is a graph showing a relationship between an over-writing characteristic and gas pressure at the time of forming a CoCr film according to the embodiment.

FIG. 4 shows a relationship between the over-writing characteristic and the gas pressure when forming the CoCr film according to the embodiment. Here, the over-writing characteristic is a ratio of output power of a high-density pattern on which a low-density pattern is overwritten to output power of the high-density pattern before overwriting.

With reference to FIG. 4, the over-writing characteristic is improved as the gas pressure for forming the CoCr film is increased. Specifically, the overwriting characteristic is improved by about 3 dB at 2 Pa in comparison with 0.5 Pa. The improvement in the over-writing characteristic is considered to be due to reduced distribution of the magnetic field for reversing the slanted magnetization of the magnetic particles, which in turn is due to improvement in the separation of the magnetic particles, which is further due to a gap section formed by the increased gas pressure in the non-magnetism members between the magnetic particles of the CoCr film. Consequently, it is considered that the required field intensity for reversing the magnetization of CoCrPt—SiO2 film and the CoCrPt film is reduced by the exchange-coupling field, the direction of which changes with the magnetization reversal of the Co$_{80}$Cr$_{20}$ film.

Figure 5:
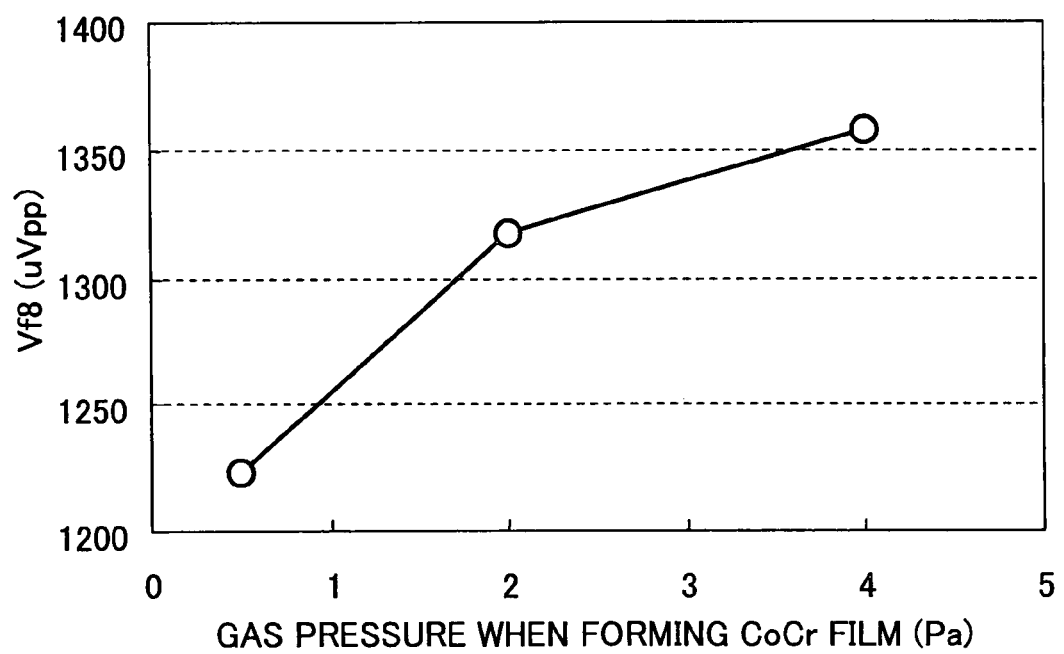
FIG. 5 is a graph (No. 1) showing a relationship between an output characteristics and the gas pressure at the time of forming the CoCr film.
Figure 6:
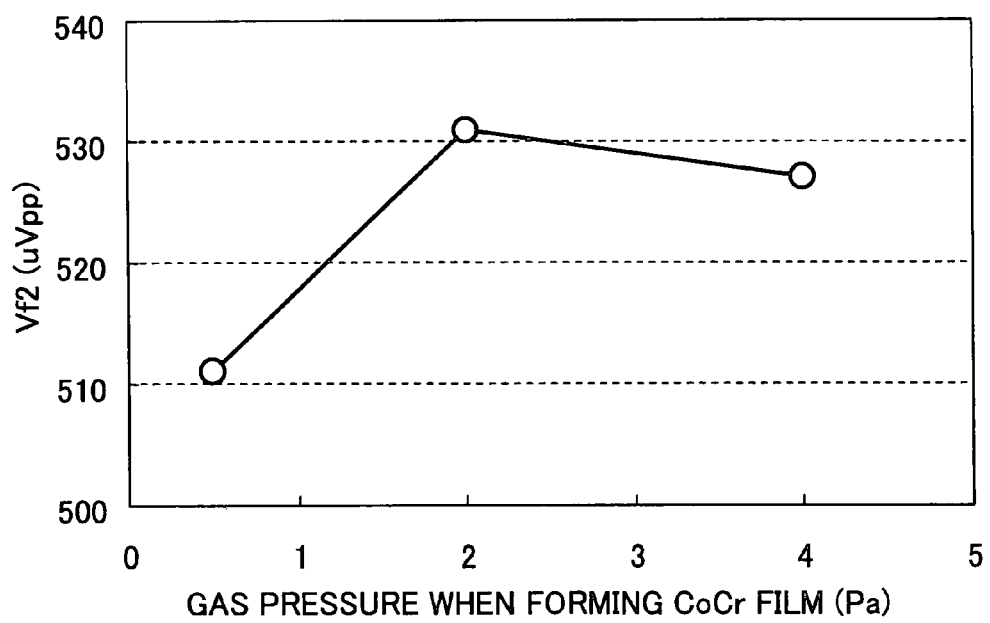
FIG. 6 is a graph (No. 2) showing a relationship between the output characteristics and the gas pressure at the time of forming the CoCr film according to the embodiment.

FIG. 5 and FIG. 6 show relationships between output characteristics and the gas pressure when forming the CoCr film according to the embodiment.

With reference to FIG. 5 and 6, reproduction outputs Vf8 and Vf2 at 2 Pa and 4 Pa are greater than the corresponding outputs at 0.5 Pa. Here, Vf8 represents the reproduction output when recording at the lowest recording line density available in a system, and Vf2 represents the reproduction output when recording at the highest recording line density of the system.

Figure 7:
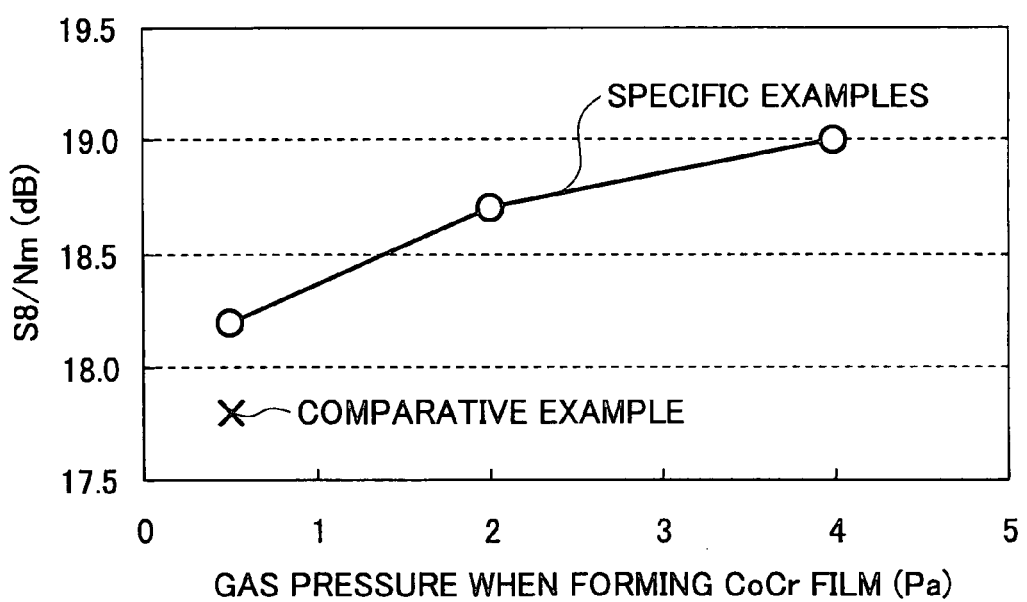
FIG. 7 is a graph (No. 1) showing relationships between a S/N ratio and the gas pressure at the time of forming the CoCr film according to the embodiment and according to the comparative example.
Figure 8:
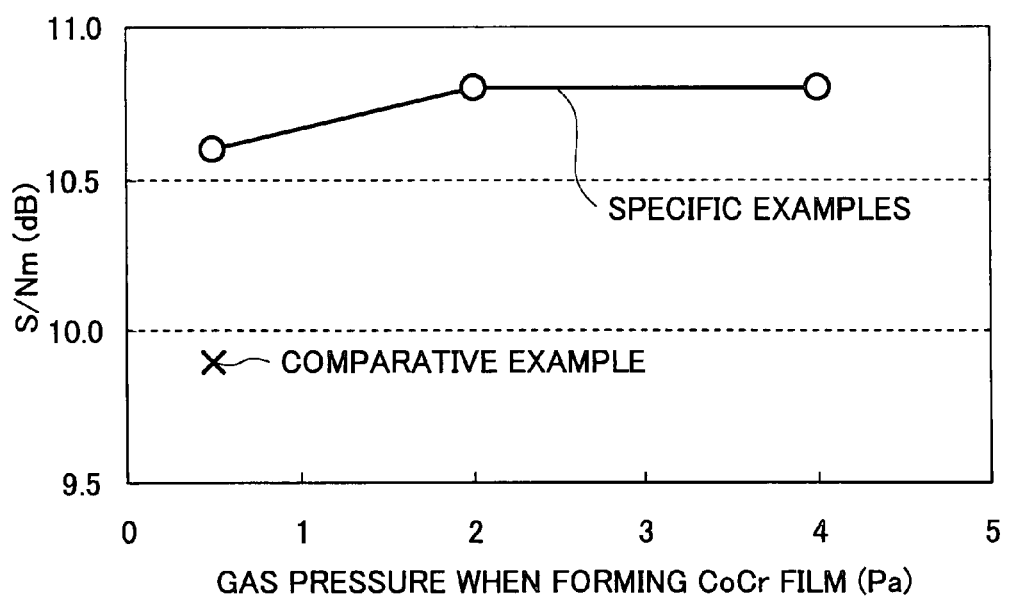
FIG. 8 is a graph (No. 2) showing relationships between the S/N ratio and the gas pressure at the time of forming the CoCr film according to the embodiment and according to the comparative example.

FIG. 7 and FIG. 8 show relationships between the S/N ratios and the gas pressure for forming the CoCr film according to the embodiment (specific examples) and the comparative example. Here, S8/Nm shown in FIG. 7 is a ratio of the reproduction output Vf8 (FIG. 5) to the medium noise, and S/Nm shown in FIG. 8 is a ratio of the reproduction output Vf2 (FIG. 6) to the medium noise.

With reference to FIG. 7 and 8, both S8/Nm and S/N ratios are improved with the increase in the gas pressure. The improvement is due to the improvement in the over-writing characteristic with the increase in the gas pressure, and the increases in the Vf8 and Vf2. Further, the S/N ratios (S8/Nm and S/N) of the specific examples are greater than the comparative example. This is due to the improvements in the recording characteristics attained by providing the exchange-coupling-strength control layer (Ru film) and the auxiliary recording layer (Co$_{80}$Cr$_{20}$ film) in the specific examples; these layers are not provided in the comparative example.

As described above, it is desirable that the gas pressure for forming the CoCr film be 2.0 Pa or greater, while 0.5 Pa or greater is sufficient. Further, the gas pressure is desired to be less than 10 Pa in view of obtaining desirable crystallinity of the magnetic particles of the CoCr film.

The second embodiment of the present invention provides a magnetic storage apparatus 60 that includes the perpendicular magnetic recording medium according to the first embodiment.

Figure 9:
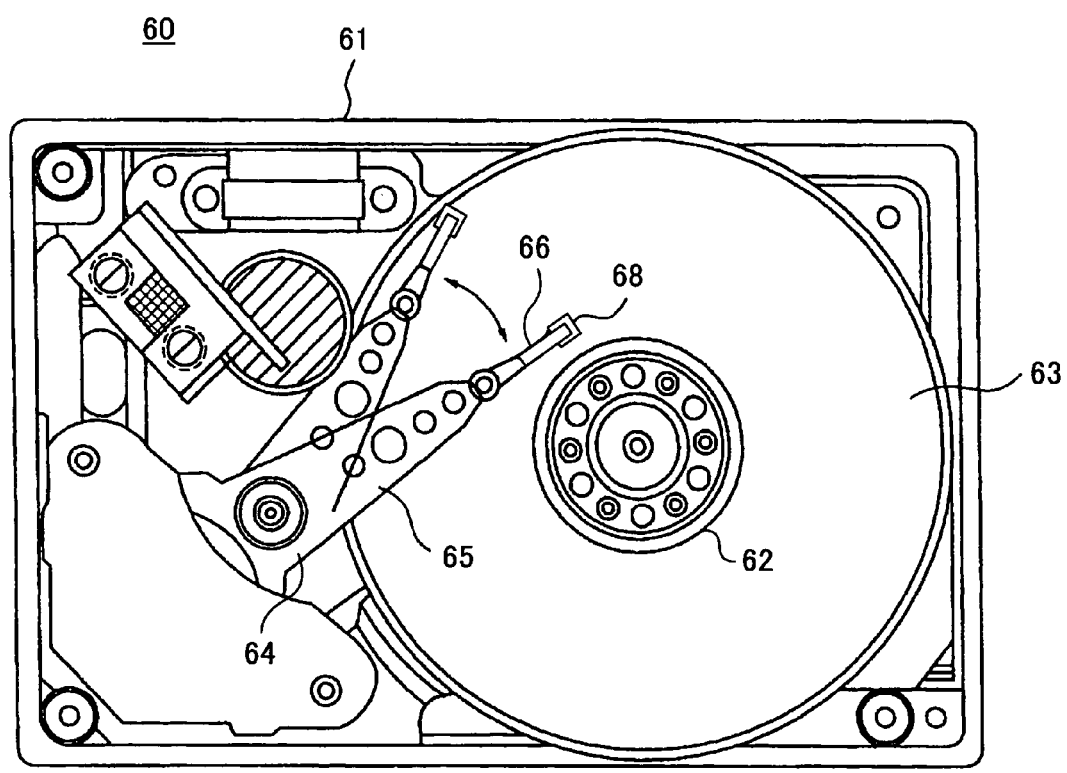
FIG. 9 is a cut-away drawing showing the main part of a magnetic storage apparatus according to the second embodiment of the present invention.

FIG. 9 shows the principal parts of the magnetic storage apparatus 60 according to the second embodiment of the present invention. As shown in FIG. 9, the magnetic storage apparatus 60 includes a housing 61 that includes a hub 62 that is rotationally driven by a spindle (not illustrated), a perpendicular magnetic recording medium 63 that is fixed to the hub 62, an actuator unit 64, an arm 65 and a suspension 66 that are attached to the actuator unit 64, and a magnetic head 68 supported by the suspension 66, wherein the arm 65 and the suspension 66 move in a direction of the diameter of the perpendicular magnetic recording medium 63. The magnetic head 68 is a compound head including a reproducing head and a recording head. The reproducing head is made of one of a MR component (magneto-resistance-effect type component), a GMR component (great magneto-resistance-effect type component), and a TMR component (the tunnel MAG effectiveness type). The recording head is an induction type head. The basic configuration of the magnetic storage apparatus 60 is commonly known, and no details are repeated here.

The perpendicular magnetic recording medium 63 is one of the perpendicular magnetic recording media 10 and 30 according to the first implementation and the second implementation, respectively, of the first embodiment. Accordingly, the perpendicular magnetic recording medium 63 includes the auxiliary recording layer, and its over-writing characteristic and the S/N ratio are improved so that the magnetic storage apparatus 60 is capable of high-density recording.

In addition, the basic configuration of the magnetic storage apparatus 60 according to the second embodiment is not limited to what is shown in FIG. 9. Further, the reproducing head is not limited to the configuration described above, but a publicly known reproducing head can be used.

In addition, although the embodiments are described about the perpendicular magnetic recording medium formed on the disk-shaped substrate, it is for example only; the perpendicular magnetic recording medium can formed on a tape-shaped substrate, i.e., a plastic tape, such as PET, PEN, and polyimide, instead of the disk-shaped substrate.

Further, the present invention is not limited to these embodiments, but variations and modifications may be made without departing from the scope of the present invention.

The present application is based on Japanese Priority Application No. 2006-276762 filed on Oct. 10, 2006 with the Japanese Patent Office, the entire contents of which are hereby incorporated by reference.

What is claimed is:

1. A perpendicular magnetic recording medium, comprising:
    a substrate;
    a soft magnetic lining layer formed on the substrate; and
    a recording layer comprising a first recording layer, an auxiliary recording layer, and a second recording layer laminated in this sequence on the soft magnetic lining layer;
    wherein each of the first recording layer and the second recording layer is formed by a ferromagnetic layer having a magnetization easy axis perpendicular to the ferromagnetic layer;
    the auxiliary recording layer includes a plurality of magnetic particles that are mutually separated by non-magnetism members
    and are formed perpendicular to the ferromagnetic layer;
    the magnetic particles have magnetization easy axes uniformly angled at a predetermined angle selected within a range between 60° (degrees) and 80° (degrees) with reference to the ferromagnetic layer; and
    the auxiliary recording layer is exchange-coupled to the first recording layer and the second recording layer, and in contact with the first recording layer or the second recording layer.

2. The perpendicular magnetic recording medium as claimed in claim 1, wherein an exchange-coupling-strength control layer for controlling exchange-coupling strength between the first recording layer and the auxiliary recording layer is provided between the first recording layer and the auxiliary recording layer.

3. The perpendicular magnetic recording medium as claimed in claim 1, wherein an exchange-coupling-strength control layer for controlling exchange-coupling strength between the auxiliary recording layer and the second recording layer is provided between the auxiliary recording layer and the second recording layer.

4. The perpendicular magnetic recording medium as claimed in claim 2, wherein the exchange-coupling-strength control layer is one of
    a non-magnetism layer,
    a non-magnetism layer and a ferromagnetic layer that has a magnetization easy axis perpendicular to the layer, and
    a non-magnetism layer sandwiched by two ferromagnetic layers that have a magnetization easy axis perpendicular to the layer.

5. The perpendicular magnetic recording medium as claimed in claim 4, wherein the non-magnetism layer is 0.5nm thick or less.

6. The perpendicular magnetic recording medium as claimed in claim 1, wherein the ferromagnetic material of the first recording layer and the second recording layer includes a ferromagnetic material that has a hexagonal close-packed crystal structure, wherein the ferromagnetic material is one of Co, CoCr, CoPt, CoCrTa, CoCrPt, and CoCrPt-M, where M is at least one of B, Mo, Nb, Ta, W, and Cu.

7. The perpendicular magnetic recording medium as claimed in claim 1, wherein the first recording layer includes magnetic particles of a ferromagnetic material, and non-solid-soluble layers that surround the magnetic particles, wherein the non-solid-soluble layers include a nonmagnetic material, wherein the ferromagnetic material is one of CoCr, CoPt, CoCrTa, CoCrPt, and CoCrPt-M, wherein M is at least one of B, Mo, Nb, Ta, W, and Cu.

8. The perpendicular magnetic recording medium as claimed in claim 1, wherein the second recording layer is one of CoCr, CoPt, CoCrTa, CoCrPt, and CoCrPt-M, where M is at least one of B, Mo, Nb, Ta, W, and Cu.

9. The perpendicular magnetic recording medium as claimed in claim 1, wherein the second recording layer includes a ferromagnetic artificial lattice film wherein a thin film of a ferromagnetic element and a thin film of a non-magnetism element are alternately laminated.

10. The perpendicular magnetic recording medium as claimed in claim 1, wherein the auxiliary recording layer is made from a ferromagnetic material that mainly includes CoCr.

11. The perpendicular magnetic recording medium as claimed in claim 10, wherein the non-magnetism members of the auxiliary recording layer have a gap section.

12. The perpendicular magnetic recording medium as claimed in claim 1, wherein the auxiliary recording layer includes magnetic particles and non-solid-soluble layers that are made from a nonmagnetic material and surround the magnetic particles, wherein the magnetic particles are made of a ferromagnetic material that mainly includes CoCr.

13. The perpendicular magnetic recording medium as claimed in claim 10, wherein the magnetic particles of the auxiliary recording layer form a CoCr film.

14. The perpendicular magnetic recording medium as claimed in claim 1, further comprising a middle layer arranged between the soft magnetic lining layer and the first recording layer, wherein the middle layer is made from one of Ru and an Ru alloy, wherein the Ru alloy is an Ru-X1 alloy that has a hexagonal close-packed crystal structure, wherein X1 is at least one of Co, Cr, Fe, Ni, and Mn.

15. The perpendicular magnetic recording medium as claimed in claim 14, further comprising:
    a seed layer; and
    a foundation layer; wherein the seed layer and the foundation layer are laminated in this sequence between the soft magnetic lining layer and the middle layer, wherein the seed layer is an amorphous non-magnetism layer, and the foundation layer is a crystalline-substance layer that has a face-centered cubic lattice crystal structure.

16. A magnetic storage apparatus, comprising:
    the perpendicular magnetic recording medium as claimed in claim 1;
    a recording-and-reproducing unit including a recording element and a magneto-resistance-effect type reproducing element.

* * * * *